(12) United States Patent
Dietz et al.

(10) Patent No.: US 7,752,844 B2
(45) Date of Patent: Jul. 13, 2010

(54) ENGINE BRAKING METHOD FOR AN INTERNAL COMBUSTION ENGINE HAVING TWO SERIALLY ARRANGED EXHAUST-GAS TURBOCHARGERS

(75) Inventors: Martin Dietz, Stuttgart (DE); Peter Fledersbacher, Stuttgart (DE); Gernot Hertweck, Fellbach (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 435 days.

(21) Appl. No.: 11/894,701

(22) Filed: Aug. 21, 2007

(65) Prior Publication Data

US 2008/0216795 A1    Sep. 11, 2008

Related U.S. Application Data

(63) Continuation-in-part of application No. PCT/EP2006/001265, filed on Feb. 11, 2006.

(30) Foreign Application Priority Data

Feb. 25, 2005    (DE) ........................ 10 2005 008 657

(51) Int. Cl.
  *F02D 23/00* (2006.01)
  *F02B 33/44* (2006.01)
  *F02B 37/013* (2006.01)
  *F02B 37/24* (2006.01)

(52) U.S. Cl. ............... 60/602; 60/611; 60/612

(58) Field of Classification Search ........... 60/611–612, 60/602, 605.1; *F02B 37/013, 37/24*
  See application file for complete search history.

(56) References Cited

U.S. PATENT DOCUMENTS 3,141,293 A * 7/1964 Crooks .................... 60/611

| 4,930,315 | A | * | 6/1990 | Kanesaka ..................... 60/612 |
| 5,199,261 | A | * | 4/1993 | Baker ......................... 60/612 |
| 5,408,979 | A | * | 4/1995 | Backlund et al. .............. 60/612 |
| 6,085,524 | A | * | 7/2000 | Persson ....................... 60/602 |

(Continued)

FOREIGN PATENT DOCUMENTS

DE    198 37 978 A1    11/1999

(Continued)

OTHER PUBLICATIONS

Fully Certified English Translation of DE 198 53 360 A1, published on May 31, 2000.*

(Continued)

*Primary Examiner*—Thai Ba Trieu
(74) *Attorney, Agent, or Firm*—Klaus J. Bach

(57) ABSTRACT

In an engine braking method and an internal combustion engine including an engine braking arrangement, wherein the engine has high pressure and low pressure exhaust gas turbochargers connected in series, with a bypass (12) around the high-pressure compressor allowing the air mass flow selectively to bypass the high pressure compressor which is arranged near the engine, and bypasses around both turbines permitting the exhaust gas mass flow selectively to bypass the high-pressure exhaust gas turbine which is near the engine and also the low pressure turbine the intake air and the exhaust gas flow are controlled so as to accurately provide for a desired engine braking power for example for maintaining a desired vehicle speed.

4 Claims, 2 Drawing Sheets

U.S. PATENT DOCUMENTS

| | | | |
|---|---|---|---|
| 6,112,523 A * | 9/2000 | Kamo et al. | 60/612 |
| 6,324,846 B1 * | 12/2001 | Clarke | 60/612 |
| 6,378,308 B1 * | 4/2002 | Pfluger | 60/612 |
| 6,973,787 B2 * | 12/2005 | Klingel | 60/612 |
| 7,322,194 B2 * | 1/2008 | Sun et al. | 60/602 |
| 2006/0070381 A1 * | 4/2006 | Parlow et al. | 60/612 |
| 2007/0056283 A1 * | 3/2007 | Klingel | 60/612 |
| 2007/0119168 A1 * | 5/2007 | Turner | 60/612 |

FOREIGN PATENT DOCUMENTS

| | | |
|---|---|---|
| DE | 198 53 360 A1 | 5/2000 |
| DE | 199 61 610 A1 | 4/2001 |
| DE | 101 44 663 A1 | 4/2003 |
| DE | 103 19 594 A1 | 11/2004 |
| EP | 0 864 737 A1 | 9/1998 |
| EP | 1 387 058 A2 | 2/2004 |
| EP | 1 394 380 A1 | 3/2004 |

OTHER PUBLICATIONS

Fully Certified English Translation of EP 1 387 058 A2, published on Feb. 4, 2004.*

* cited by examiner

ENGINE BRAKING METHOD FOR AN INTERNAL COMBUSTION ENGINE HAVING TWO SERIALLY ARRANGED EXHAUST-GAS TURBOCHARGERS

This is a Continuation-In-Part Application of pending International patent Application PCT/EP2006/001265 filed 11 Feb. 2006 and claiming the priority of German Patent Application 10 2005 008 657.8 filed 25 Feb. 2005.

BACKGROUND OF THE INVENTION

The invention relates to an engine braking method for an internal combustion engine having two serially arranged exhaust-gas turbochargers, each having an exhaust gas turbine with a bypass line including a valve for controlling the exhaust gas flow through the turbines.

DE 198 53 360 A1 discloses an internal combustion engine which is equipped with two exhaust-gas turbochargers which are connected in series. The larger of the two superchargers is arranged remotely from the engine and performs the function of the main supercharger, and the smaller is arranged near the engine and functions as an additional supercharger which can be placed in service as necessary. The connection and disconnection of the additional supercharger is carried out using a shut-off device which comprises a rotary slide valve in the intake manifold and also one in the exhaust manifold. When the additional supercharger is connected the mass flows in the intake manifold and in the exhaust manifold are directed through the compressor or, respectively, the turbine of the additional supercharger and, in contrast, when the additional supercharger is disconnected the mass flows are directed to bypass the additional charger via bypass lines. Furthermore, a bypass is provided for bypassing the exhaust gas turbine of the main supercharger.

The two-stage supercharging can be used to increase the power both in the powered engine operation and in the engine braking mode. In order to achieve a high engine braking power, a variable turbine geometry in the exhaust gas turbine of the main supercharger is moved to the shut-off position as a result of which an increased exhaust gas back pressure is generated between the outlet of the internal combustion engine and the inlet of the turbine with a variable turbine geometry. The exhaust gas flows via the remaining open flow cross section of the variable turbine geometry into the turbine and strikes the turbine wheel at high flow speed, so that the compressor wheel is also driven at high speed and an increased supercharging pressure is generated in the intake manifold. In this way, an increased pressure level is generated in the cylinders, against which the pistons of the internal combustion engine have to perform compression work on the air side and also on the exhaust gas side. The exhaust gas back pressure and the supercharging pressure can be increased further by the connection of the additional supercharger.

Based on this prior art, it is the object of the pre-sent invention to provide an arrangement for varying the engine braking power in an internal combustion engine with two serially arranged exhaust-gas turbochargers over a wide power spectrum by using only simple means. More specifically, it is the object of the invention to provide both, for a high engine braking power and the possibility of an adjustment to a desired target value, for example for providing a cruise control function.

SUMMARY OF THE INVENTION

In an engine braking method and an internal combustion engine including an engine braking arrangement, wherein the engine has high pressure and low pressure exhaust gas turbochargers connected in series, with a bypass (12) around the high-pressure compressor allowing the air mass flow selectively to bypass the high pressure compressor which is arranged near the engine, and bypasses around both turbines including control valves permitting a controllable amount of the exhaust gas mass flow to bypass the exhaust gas turbines which is near the engine and also the low pressure turbine so that the intake air and the exhaust gas flows are controlled in order to accurately provide in a simple manner for a desired engine braking power for example for maintaining a desired vehicle speed.

With the engine braking method and the arrangement according to the invention, it is possible, to omit a variable turbine geometry by means of which the turbine inlet cross section could be adjusted between a minimum backup position and a maximum open position. The exhaust gas turbines can therefore be embodied in a structurally very simple way without this leading to a decrease in the level of the engine braking power or in the variability of the generation of the braking power.

With the method according to the invention for example a bypass which bypasses the compressor which is nearer the engine is closed in the engine braking mode so that the air which is sucked in and pre-compressed in the compressor which is remote from the engine is also fed through the compressor which is near the engine and further compressed in this compressor. Furthermore, on the exhaust gas side the control valve in the bypass around the exhaust gas turbine which is near the engine is adjusted in order to provide the desired or requested engine braking power by providing an adjustable exhaust gas mass flow through the exhaust gas turbine which is near the engine that is by controlling the supercharger power of the exhaust-gas turbocharger which is near the engine.

In an expedient development, a further adjustable bypass is provided which bypasses the exhaust gas turbine which is remote from the engine. In order to increase the engine braking power, this bypass which bypasses the exhaust gas turbine which is remote from the engine is adjusted in the direction of the open position, as a result of which the pressure between the exhaust gas turbine which is near the engine and the exhaust gas turbine which is remote from the engine are lowered and the drop in pressure across the exhaust gas turbine which is near the engine is increased. This permits a relatively high exhaust gas mass flow rate through the exhaust gas turbine which is near the engine, which goes hand in hand with an increased supercharger power of the supercharger which is near the engine and a correspondingly increased engine braking power.

Basically, a plurality of intervention possibilities are available for setting the desired engine braking power. According to the principle, the check valves in the bypass lines of the compressor which is near the engine, of the exhaust gas turbine which is near the engine and of the exhaust gas turbine which is remote from the engine can be adjusted. In order to implement a cruise control function it is also suitable to set the mass flows through the bypass which bypasses the exhaust gas turbine which is remote from the engine and those through the bypass which bypasses the compressor which is near the engine, the bypass of the exhaust gas turbine which is near the engine remaining closed in this situation so that the entire exhaust gas mass flow is fed through the exhaust gas turbine which is near the engine.

Likewise, for the implementation of a target function of a state variable or of some other characteristic variable of the internal combustion engine or of the vehicle it may be advantageous to reduce the engine braking power through stepped measures with a fixed sequence starting from a high engine braking power value. In this context, the bypass which bypasses the exhaust gas turbine which is remote from the engine is firstly adjusted in the direction of the closed position, as a result of which the drop in pressure across the exhaust gas turbine which is near the engine is reduced, and the turbine power generated in the exhaust gas turbine which is near the engine is also reduced. If this measure is not sufficient to reduce the engine braking power to a desired low value, the bypass which bypasses the compressor which is near the engine can, as a following measure, be adjusted in the direction of the open position so that an increasing proportion of the air mass flow is directed through this bypass so that it bypasses the compressor wheel. As a result, a relatively small proportion of the air mass flow from the compressor wheel is compressed to a raised supercharging pressure, which leads overall to a lower pressure level and a correspondingly lower engine braking power.

As a further measure the bypass which bypasses the exhaust gas turbine which is near the engine can be adjusted in the toward an open positions, with the result that an increasing exhaust gas mass flow is directed past this exhaust gas turbine and the exhaust gas turbine which is near the engine generates correspondingly less supercharger power. At the same time, the bypass of the exhaust gas turbine which is remote from the engine is expediently opened, with the result that the exhaust gas also bypasses the exhaust gas turbine which is remote from the engine, so as to prevent operation of the exhaust gas turbine which is remote from the engine in the region of its choke line.

The invention will become more readily apparent from the following description of a particular embodiment thereof with reference to the accompanying drawing.

DESCRIPTION OF A PARTICULAR EMBODIMENT

Figure 1:
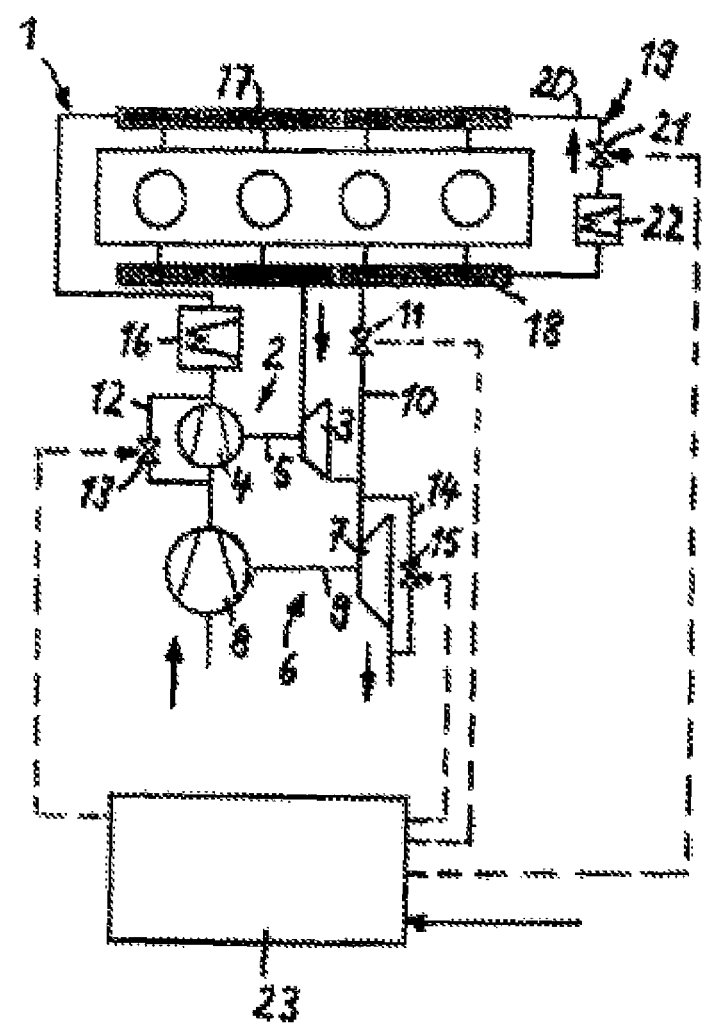
FIG. 1 shows schematically an internal combustion engine which is provided with two exhaust gas turbochargers.
Figure 2:
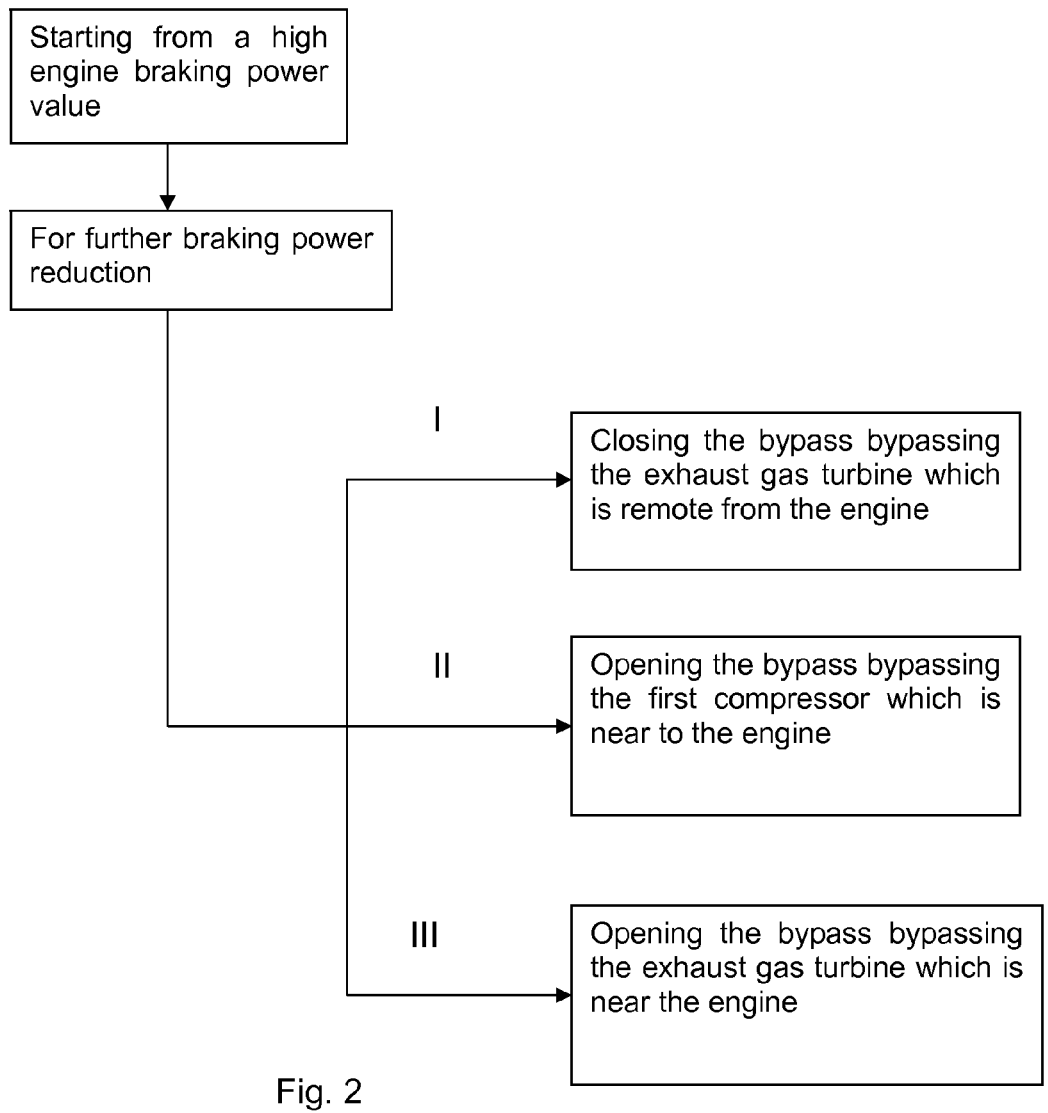
FIG. 2 is a flowchart of controlling bypasses for reducing the engine braking power when starting from a high engine braking value.

An internal combustion engine 1, a diesel internal combustion engine or a spark ignition engine, is equipped with two exhaust-gas turbochargers 2 and 6 which are connected in series, with the exhaust-gas turbocharger 2 which is near the engine being a high pressure supercharger and the exhaust-gas turbocharger 6 which is remote from the engine being a lower pressure supercharger. The exhaust-gas turbocharger 2 which is near the engine comprises an exhaust gas turbine 3 in the exhaust gas tract whose turbine wheel is connected in a rotationally fixed fashion via a shaft 5 to the compressor wheel of an assigned compressor 4 in the intake tract. In a corresponding way, the exhaust-gas turbocharger 6 which is remote from the engine comprises an exhaust gas turbine 7 in the exhaust tract, the turbine wheel of which is connected in a rotationally fixed fashion via a shaft 9 to the compressor wheel in the assigned compressor 8 in the intake tract. The exhaust gas turbine 3 which is near the engine, the compressor 4 which is near the engine and the exhaust gas turbine 7 which is remote from the engine can be bypassed using bypass lines 10, 12 and 14 respectively with adjustable control valves 11, 13 and 15 arranged therein. These control valves are set by actuating signals of a closed-loop and open-loop control unit 23 as a function of state variables and operational variables of the internal combustion engine or of the assemblies or of certain values which are monitored by the driver of a vehicle in which the internal combustion engine is installed.

The exhaust gas turbines 3 and 7 are embodied as what are referred to as fixed geometry turbines which are distinguished by a particularly simple structural design. The effective turbine inlet flow cross sections cannot be changed in these fixed geometry turbines.

While the internal combustion engine is operating, combustion air is sucked in to the intake manifold, pre-compressed in the low pressure compressor 8 which is remote from the engine, subsequently compressed to the final value in the high pressure compressor 4 which is connected in series, and finally cooled in a supercharged air cooler 16 which is arranged downstream of the high pressure compressor and then fed under supercharging pressure to an air inlet manifold 17 by means of which the combustion air is supplied to the cylinders of the internal combustion engine 1. On the exhaust gas side, the exhaust gas is firstly collected in an exhaust gas manifold 18 and passed on from there into the exhaust tract in which the exhaust gas firstly flows through the exhaust gas turbine 3 which is near the engine and subsequently flows through the exhaust gas turbine 7 which is remote from the engine. Adjustments can be carried out by controlling the control valves 11, 13 and 15 in the above-described bypass lines 10, 12 and 14 bypassing the exhaust gas turbine 3 which is near the engine, the compressor 4 which is near the engine and the exhaust gas turbine 7 which is remote from the engine.

Furthermore, the internal combustion engine 1 is equipped with an exhaust gas recirculation device 19 which comprises a recirculation line 20 between the exhaust tract and the intake tract, in particular between the exhaust gas manifold 18 and the intake air manifold 17, with an adjustable check valve 21 and an exhaust gas cooler 22 being arranged in the recirculation line 20. The control valve 21 is also controlled by actuating signals of the closed-loop and open-loop control unit 23.

In the engine braking mode the air mass flow through the bypass 12 which bypasses the compressor 4 which is near the engine and the exhaust gas mass flow through the bypass 10 which bypasses the exhaust gas turbine 3 which is near the engine are controlled in order to be able to set the desired or requested engine braking power. For a maximum engine braking power the valve 15 in the bypass 14 which bypasses the exhaust gas turbine 7 which is remote from the engine is opened, whereby the pressure downstream of the exhaust gas turbine 3 which is near the engine drops and the pressure drop across the exhaust gas turbine 3 which is near the engine is increased.

In order to set a constant vehicle velocity (cruise control function), the mass flows through the exhaust gas turbine 7 which is remote from the engine and through the compressor 7 which is near the engine are controlled by a corresponding adjustment of the control valves 15 and 13, in the bypass lines 14 and 12, respectively. By opening the control valve 13 in order to bypass the compressor 4 which is near the engine it is additionally possible to ensure that the maximum permissible compressor temperature is not exceeded.

In order to reduce the engine braking power, again starting from a high braking power value, the following measures are expediently carried out: firstly the bypass 14 which bypasses the exhaust gas turbine 7 which is remote from the engine is adjusted toward the closed position by actuating the control valve 15 which is arranged therein, as a result of which the pressure across the exhaust gas turbine 3 which is near the engine is reduced. If this measure is not sufficient, the control valve 13 in the bypass 12 is additionally adjusted toward the open position in order to bypass the compressor 4 which is near the engine, with the result that a smaller quantity of air is compressed. As a last measure for further reducing the engine braking power, the bypass 10 which bypasses the exhaust gas turbine 3 which is near the engine is adjusted toward the open position, as a result of which the back pressure of the exhaust gas between the cylinder outlet and the exhaust gas turbine 3, which is near the engine drops, and the power output of the turbine is correspondingly reduced. This last measure advantageously goes hand in hand with opening of the bypass 14 in order to bypass the exhaust gas turbine 7 which is remote from the engine, in order to ensure that the exhaust gas turbine 7 which is remote from the engine does not inadvertently reach its choke line range.

The invention claimed is:

1. An engine braking method for an internal combustion engine (1) having two exhaust gas turbochargers (2, 6), each of the two exhaust gas turbochargers (2, 6) having an exhaust gas turbine (3, 7) arranged in series in the an exhaust tract of the engine (1) and each of the two exhaust gas turbines (3, 7) including a fixed geometry turbine inlet passage, a bypass line (10, 14) extending around each exhaust gas turbine (3, 7) with a control valve (11, 15) in each bypass line (10, 14) for selectively permitting the exhaust gas flow to bypass at least one of the turbines, and each of the two exhaust gas turbochargers (2, 6) including a first compressor (4) and a second compressor (8) arranged in series in an intake tract of the engine (1) and the first compressor (4) arranged in the intake tract nearer the engine (1) including a bypass line (12) with a valve (13) for selectively permitting the compressed intake air to bypass the first compressor (4) arranged nearer the engine, said method comprising the steps of:

controlling the air mass flow bypassing the first compressor (4) arranged nearer the engine and the exhaust gas mass flow through at least one of the bypass lines (10, 14) around the two exhaust gas turbines (3, 7) depending on the desired engine braking power, and, for increasing the engine braking power, opening the valve (15) of the bypass of the turbine (7) remote from the engine (1) to permit exhaust gas to flow through the bypass line (14) past the turbine (7) remote from the engine (1).

2. The engine braking method as claimed in claim 1, further including, for providing a constant downhill vehicle velocity controlling the exhaust gas mass flowing through the bypass line (14) which bypasses the exhaust gas turbine (7) arranged remote from the engine and controlling the air flowing through the bypass line (12) which bypasses the first compressor (4) which is near the engine so as to maintain a vehicle at constant velocity in a braking cruise control mode.

3. The engine braking method as claimed in claim 1, wherein for reducing the engine braking power starting from a high engine braking power value, the following steps are performed:

I. closing the bypass (14) which bypasses the exhaust gas turbine (7) which is remote from the engine and, for further braking power reduction,
   II. opening the bypass (12) which bypasses the first compressor (4) which is near to the engine, and, for still further braking power reduction,
   III. opening the bypass (10) which bypasses the exhaust gas turbine (3) which is near the engine.

4. The engine braking method as claimed in claim 3, and further including opening the bypass (14) which bypasses the exhaust gas turbine (7) which is remote from the engine upon opening of the bypass (10) which bypasses the exhaust gas turbine (3) which is near the engine.

* * * * *